July 8, 1969
D. A. DYE
3,454,251
RETRACTABLE STABILIZING AND LEVELING SUPPORT
ASSEMBLY FOR TRAILERS
Filed April 14, 1967
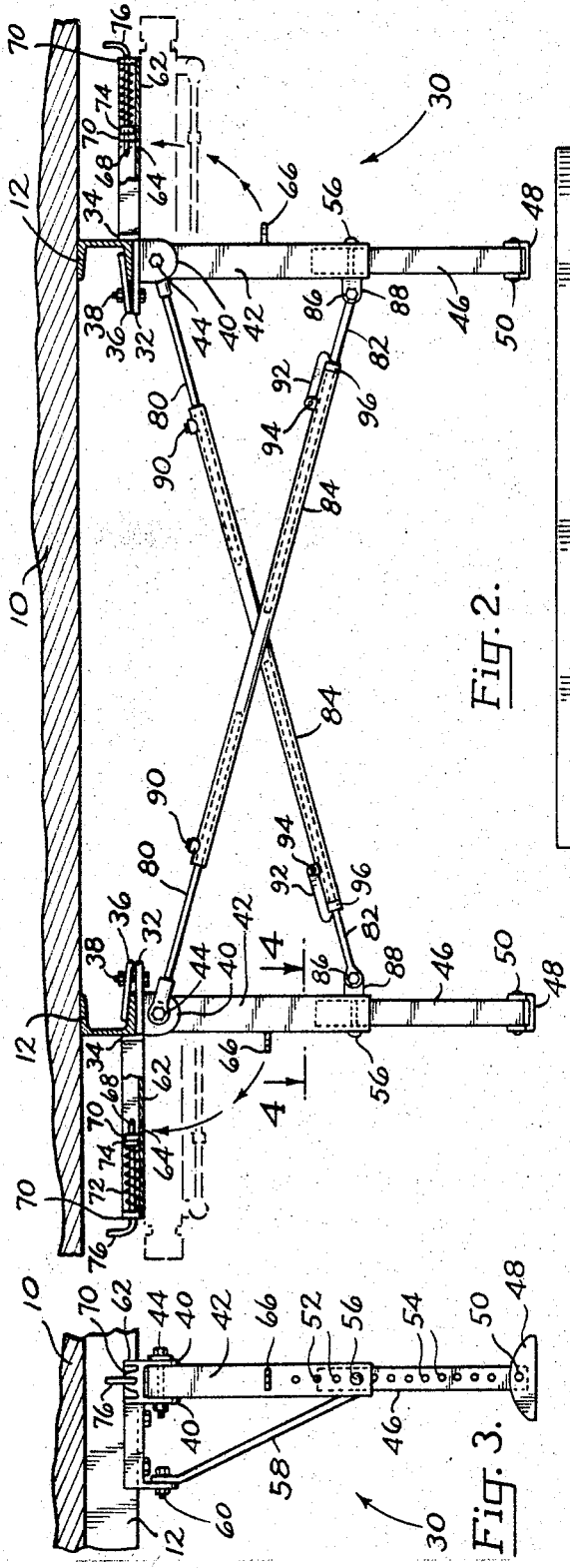
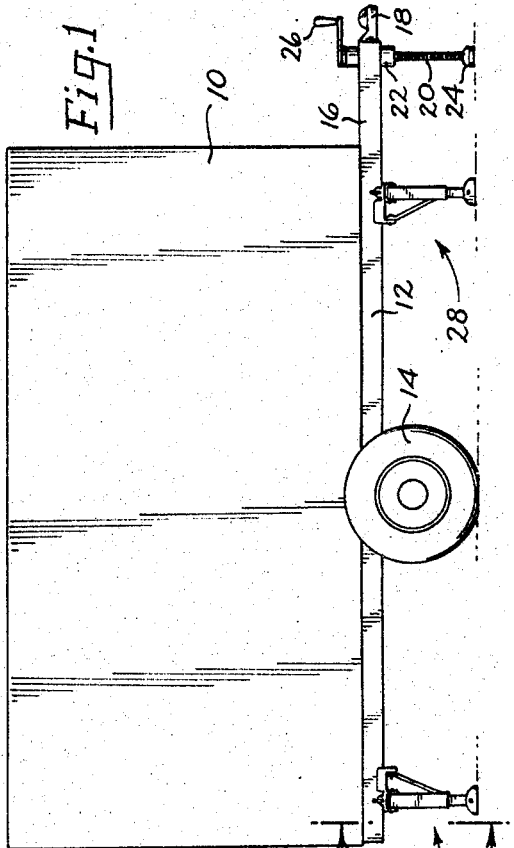
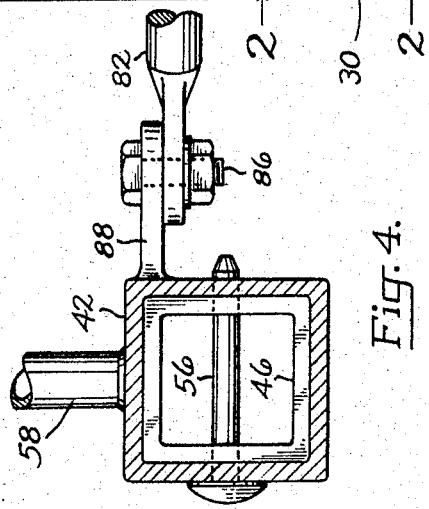
Dorsey A. Dye
INVENTOR
BY
*Oliver D. Olson*
Agent

United States Patent Office 3,454,251
Patented July 8, 1969

3,454,251
RETRACTABLE STABILIZING AND LEVELING
SUPPORT ASSEMBLY FOR TRAILERS
Dorsey A. Dye, 18400 W. Baseline Road,
Beaverton, Oreg. 97005
Filed Apr. 14, 1967, Ser. No. 630,897
Int. Cl. F16n 13/00
U.S. Cl. 248—354                                      2 Claims

ABSTRACT OF THE DISCLOSURE

A pair of extensible legs are connected pivotally to separate supports each of which includes a clamp for attaching the supports to laterally spaced longitudinal beams of a trailer frame. Each support also includes a latch for securing the associated leg in retracted position. Elongated tie rods pivotally interconnect each support and the opposite leg, and the tie rods are adjustable in length to accommodate variable spacings between legs as dictated by the spacing between the lateral beams of the trailer frame.

Background of the invention

This invention relates to devices for supporting parked trailers in a level and stable condition, and more particularly to a trailer support of the class described which is capable of attachment to trailers of various sizes and dimensions without modification of the trailer.

Trailer supports provided heretofore are not readily adaptable for mounting on trailers of various sizes and dimensions. Their attachment to a trailer requires modification of the latter by some one having the necessary skill and tools. And they generally are mounted in such manner as to be difficult to operate because of the inconvenient accessibility of operating parts.

Summary of the invention

Broadly, the present invention provides a trailer stabilizing and leveling support assembly which includes clamping means for securing it to a trailer frame without modification of the latter, and which also includes longitudinally adjustable tie rods which interconnect and stabilize a laterally spaced pair of adjustable legs, thereby accommodating the mounting of the assembly on trailers of various sizes and dimensions.

It is the principal object of the present invention to overcome the disadvantages of prior devices of the class described by providing a stabilizing and leveling support assembly which is adaptable for mounting on trailers of various sizes and dimensions with speed and facility without modification of the trailer, which assembly includes a pair of laterally spaced leg structures which are interconnected and supported in such manner as to be retractable with speed and facility.

Another important object of this invention is the provision of a stabilizing and leveling support assembly for trailers which is of simplified and rugged construction for economical manufacture and effective utility on trailers of diverse sizes.

The foregoing and other objects and advantages of this invention will appear from the following detailed description taken in connection with the accompanying drawing of the preferred embodiment.

Brief description of the drawing

FIG. 1 is a view in side elevation of a trailer having mounted thereon stabilizing and leveling support assemblies embodying the features of the present invention.

FIG. 2 is a fragmentary sectional view taken on the line 2—2 in FIG. 1, parts being shown in dash lines in the retracted position of the assembly.

FIG. 3 is a fragmentary sectional view as viewed from the left in FIG. 2.

FIG. 4 is a fragmentary sectional view taken on the line 4—4 in FIG. 2.

Description of the preferred embodiment

Referring particularly to FIG. 1 of the drawing there is shown for purposes of illustration a conventional trailer in which a body 10 is mounted upon a frame 12 supported on a pair of laterally spaced wheels 14. Extending forwardly from the frame is an elongated tongue 16 which terminates in the female portion 18 of a conventional trailer hitch. Also supported on the tongue adjacent the trailer hitch component is an adjustable supporting jack. The jack illustrated, which is of conventional construction, comprises an elongated screw threaded rod 20 supported for longitudinal adjustment in a threaded collar 22 secured to the tongue. The bottom end of the rod terminates in an enlarged ground engaging foot 24, and the upper end of the rod is provided with an operating handle 26.

In accordance with the present invention means is provided for supporting the trailer in parked condition in a stable and level condition, and such means is provided in the form of front and rear assemblies 28 and 30. Since the assemblies are of identical construction, only the rear assembly is illustrated in detail in FIGS. 2, 3 and 4.

The assembly detailed in the drawing includes a pair of base members each in the form of an angle iron having a horizontal portion 32 and a vertical portion 34. The vertical portions abut the outer sides of the laterally spaced longitudinal channel members 12 forming the trailer frame, and the horizontal portions abut the underside of said channel members.

Means preferably is provided for securing the base members to the trailer frame detachably and without modifying the trailer. In the embodiment illustrated this means comprises a clamping plate 36 which overlies the bottom portion of the channel member 12 and extends inwardly beyond the latter where it is secured to the inwardly extending horizontal portion 32 of the base member by means of the bolts 38. By tightening said bolts the bottom portion of the channel member is clamped securely between the base member and clamping plate. The base member thus is secured firmly to the trailer frame without modification of the latter and with the aid only of a convenitonal wrench.

Secured to and depending downwardly from each of the base members is a pair of longitudinally spaced tabs 40 which receive freely between them the upper end of the elongated, hollow upper leg section 42. The tabs and leg section have axially aligned openings therethrough for the reception of the pivot bolts 44. The axis of the pivot bolt is parallel to the longitudinal axis of the trailer, whereby the leg section is rendered pivotable in a plane extending transversely of the vehicle, between an operative vertical position and a retracted horizontal position.

A lower leg section 46 is received slidably within the hollow upper leg section 42 for telescopic adjustment. The bottom end of the lower leg section is provided with a ground engaging foot member 48 which is secured pivotally to the leg section by the transverse pivot 50.

A plurality of transverse openings 52 and 54 in the upper and lower leg sections 42 and 46, respectively, are arranged to register in pairs for the reception of the headed locking pin 56. The leg sections thus may be secured together in desired positions of relative extension and retraction, to provide a desired overall length. To provide incremental adjustment, the spacing between openings 52 in the upper leg section is made different from the spacing between openings 54 in the lower section. For example, by spacing the openings in the lower leg section three-quarters of an inch between centers and in the upper leg section one-half inch between centers, incremental adjustments of one-quarter inch are provided.

A reinforcing brace 58 for the upper leg section is secured at one end to said section and at its opposite end pivotally to the base member by means of the pivot bolt 60. This bolt is coaxial with pivot bolt 44.

Means is provided, integral with the base member, for securing each leg assembly in its retracted position during transport of the trailer. In the preferred embodiment illustrated, such means includes an elongated leg support member in the form of a channel iron 62 welded or otherwise secured at its inner end to the vertical section 34 of the base member. The leg support member thus extends laterally outward toward the lateral side of the trailer and is disposed substantially horizontally under the latter in the plane of pivotal movement of the leg assembly. The bottom, intermediate portion of the channel iron is provided with an opening 64 adapted freely to receive therethrough a projecting tab 66 on the upper leg section. This tab is provided with a transverse opening adapted to receive freely therethrough the inner end of an elongated latch rod 68. The latch rod is mounted for reciprocation in axially aligned openings in laterally spaced guides 70 in the leg support member. A coil spring 72 encircles the latch rod between the spaced tabs, abutting at its outer end against the outer tab and at its inner end against a collar 74 secured to the rod. The coil spring thus urges the latch rod resiliently inward to latching position. The outer end of the latch rod is offset to provide a finger grip 76 by which to retract the rod to release the leg member for movement from the retracted position to the operative position.

Means is provided for interconnecting the laterally spaced pair of leg assemblies for increased stability of the latter, while affording their mounting on various types and sizes of trailers wherein the lateral spacing between the longitudinal frame members 12 varies. In the embodiment illustrated such means comprises a pair of tie rod assemblies each including end rod sections 80 and 82 and an intermediate tubular rod section 84. The end rod sections are received slidably within the intermediate tubular rod section, to provide variation in overall length of the assembly. The outer end of one of the end rod sections, for example section 80, has a transverse opening which freely receives the pivot bolt 44 for one of the upper leg sections. The outer end of the opposite end rod section 82 is provided with an opening which receives the pivot bolt 86 mounted in a tab 88 projecting inwardly on the lower end of the opposite upper leg section. Said tab is offset (FIG. 4) from the central transverse plane of the leg section, on the same side as the attachment of the opposite end rod section 80 to the pivot bolt 44, to accommodate crossing of the pair of tie rod assemblies.

A set screw 90 is mounted adjacent one end of the intermediate rod section 84 for releasable engagement with the adjacent end section 80, for securing said sections together in adjusted positions of relative extension.

Quick release locking means is provided for interconnecting the intermediate rod section 84 and the opposite end section 82, for securing said sections together in the operative positions of the leg assemblies and for releasing said sections to permit retraction of the leg assemblies. In the embodiment illustrated such means is provided by the pawl 92 which is pivotally secured at one end to the intermediate rod section 84, by the pivot pin 94, and the associated locking collar 96 which is secured to the end rod section 82. In the locked position illustrated in FIG. 2, the locking collar abuts the adjacent end of the intermediate rod section and the pawl engages the opposite side of the collar.

The stabilizing and leveling support assembly described hereinbefore is installed on a trailer as follows: With the tie rod assemblies disconnected from the leg assemblies, each leg assembly is secured to the trailer frame by clamping the base members thereto as previously explained. The tie rod assemblies then are installed to interconnect the upper leg sections and opposite base members, with the set screws 90 loosened but with the locking pawls 92 engaging their associated locking collars 96. The leg assemblies then are adjusted to their vertical, operative position as illustrated in FIG. 2, and the set screws 90 tightened securely.

The leg assemblies may be retracted by releasing the locking pawls 92 and swinging the leg assemblies laterally outward and upward into abutment with the underside of the leg support members 62, after retracting the latch rods 68 to allow the latching tab 66 to enter the slot 64 in the leg support member. The latch rod then is released, whereupon the spring 72 urges the inner end of the latch rod through the opening in the tab 66.

It is to be noted that in the retracted position of the leg assembly the head of the locking pin 56 underlies the leg support member 62 and is held captive thereby against accidental retraction and loss.

It is to be understood that when the leg members are retracted for subsequent transport of the trailer, the lower leg sections 46 normally are retracted fully within the upper leg sections 42 so that the leg assemblies do not project beyond the lateral sides of the trailer.

Let it now be assumed that the trailer has been moved to a site at which it is to be parked in a stable and level position. This is achieved first by operating the jack handle 26 to raise the rear end of the trailer sufficiently to allow the rear support assembly 30 to be adjusted to operative position. The individual lower leg sections 46 then are extended to positions which appear by visual inspection to place the floor of the trailer in transversely leveled condition. The jack then is operated to lower the rear end of the trailer to place the leg foot members 48 firmly on the ground. If the trailer then is found not to be leveled transversely, the rear end of the trailer is again elevated and the legs adjusted further. This procedure is repeated until the rear end of the trailer is leveled. The jack then is operated to elevate the front end of the trailer sufficiently to move the front support assembly 28 into operative position. The leg assemblies then are adjusted to level the front end of the trailer transversely as well as longitudinally.

It will be apparent to those skilled in the art that various changes may be made in the size, shape, number and arrangement of parts described hereinbefore without departing from the spirit of this invention.

Having now described my invention and the manner in which it may be used, I claim:

1. A stabilizing and leveling support assembly for trailers, comprising:
    (a) a pair of base members,
    (b) attaching means on the base members for securing the latter to the underside of a trailer, one adjacent each lateral side of the trailer,
    (c) a pair of extensible leg assemblies secured one to each base member for pivotal movement transversely of the trailer between an operative position extending downward from the trailer and a retracted position extending laterally outward toward the sides of the trailer,
    (d) a pair of longitudinally adjustable tie rod assemblies, each pivotally interconnecting a different leg assembly and the oppoiste base assembly for longitudinal extension during retraction of the leg assemblies and longitudinal retraction during movement of the leg assemblies to operative position,
    (e) lock means on each tie rod assembly securing the latter releasably in predetermined positions of longitudinal adjustment,
    (f) leg support means on each base member projecting laterally outward therefrom toward the corresponding side of the trailer in the plane of pivotal movement of associated leg assembly,
(g) interengageable latch means on each leg support means and associated leg assembly for supporting the latter releasably in said retracted position, and
(h) latch operating means on each leg support means engaging each latch means and disposed adjacent the corresponding side of the trailer for manual operation.

2. The assembly of claim 1 wherein each tie rod assembly comprises:
(a) three longitudinally telescoping sections,
(b) the outer sections being connected pivotally to the leg assembly and base member, respectively,
(c) securing means releasably securing together the intermediate section and one end section against relative longitudinal displacement,
(d) a locking collar secured to the other end section for abutment by the intermediate section when the tie rod assembly is in its position of longitudinal retraction, and
(e) catch means on the intermediate section movable to releasably engage the locking collar to releasably secure the intermediate section in abutment therewith.

References Cited

UNITED STATES PATENTS

| | | | |
|---|---|---|---|
| 3,096,065 | 7/1963 | Horne | 248—354 |
| 3,145,008 | 8/1964 | Herpich et al. | 248—150 |

FOREIGN PATENTS

| | | |
|---|---|---|
| 499,242 | 1/1954 | Canada. |

ROY D. FRAZIER, *Primary Examiner.*

FRANK DOMOTOR, *Assistant Examiner.*

U.S. Cl. X.R.

280—150.5